Patented Jan. 15, 1946

2,392,825

UNITED STATES PATENT OFFICE 2,392,825

MODIFIED LATEX

Duncan W. MacLeod, Boston, Mass., assignor to General Latex and Chemical Corp., Cambridge, Mass., a corporation of Massachusetts No Drawing. Application July 24, 1943, Serial No. 496,067

4 Claims. (Cl. 260—815)

This invention relates to the modification of latex so as to render it extremely sensitive to certain chemical influences, and to methods of using such modified latex in the manufacture of various types of articles, the present application being a continuation-in-part of application Serial No. 237,461, filed October 28, 1938.

The usual latices of commerce, without regard to concentration, are quickly and completely coagulated by the addition of small concentrations of divalent ions such as Ca++, Zn++. They are not appreciably affected by any monovalent ion in concentrations below 5% in the water phase except H+ and Li+. Substantially insoluble compounds of divalent metals, such as zinc benzoate, etc., have little effect on them in the cold.

However, I have discovered that such latices, when properly compounded with one or more of a group of certain aromatic compounds, hereinafter more specifically defined, are very sensitive to the action of certain monovalent ions other than H+ or Li+ and certain water insoluble latex non-coagulants. Specifically, my sensitized or modified latex is greatly thickened by the addition of such insoluble material or of such monovalent ions even in concentrations much below 5% in the water phase of the latex. Under special conditions, thickening can be carried so far as to produce an apparently solid wet deposit as, for example, upon a form. These sensitizing materials I call "modifiers" and these thickening agents "developers."

The terms "modifiers" and "modifying agents" are used synonymously, and each connotes aromatic hydrocarbons which are substantially insoluble in dilute aqueous ammonia and which, per se, exhibit no thickening effect on latex, their hydroxy and amino derivatives, and the aromatic ketones, ethers and sulphoxides.

All such modifying agents appear to act by adsorption at the interface between the individual rubber particles and the external water phase. They appear to change or modify the charge distribution of the particles so that the comparatively low potential developer ions are enabled to easily neutralize the remaining particle-changes and thereby thicken the latex.

The compounds of the following groups have been found operative as modifiers:

Group A p-hydroxydiphenyl

p.p'-Dihydroxydiphenyl

Di-(p-hydroxyphenyl)-1,1-cyclohexane

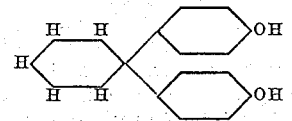

Benzidene

Group B p-Hydroxypropiophenone

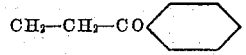

p-Hydroxyazobenzene

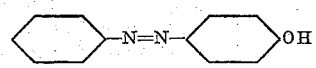

2,4-diaminodiphenylamine

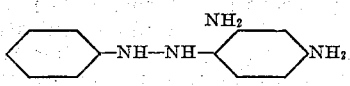

Diphenylamine

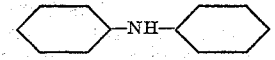

Dibenzyl

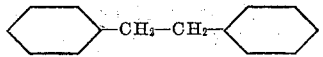

p.p'-Diaminodiphenylmethane

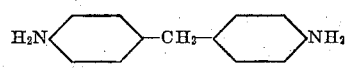

Diphenyl oxide

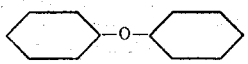

Diphenyl sulphoxide

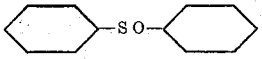

Diphenylene oxide

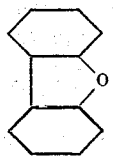

p-Diphenyl benzene

Diphenyl

p-Cyclohexyl phenol

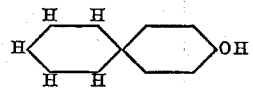

Diphenyl sulphide

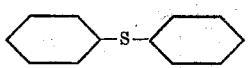

When compounded with latex which contains no developer, from 0.1 to 10% of any one or more of the modifying agents listed in Groups A and B will modify the latex as to render it capable of being thickened at room temperatures on the addition of the developer. Thickening in the cold can thus be effected without the use of heated forms and with amounts of developer too small to impair the desirable properties of the rubber articles produced from the latex.

Addition of any one of these modifiers alone to latex will not produce thickening or coagulation under any circumstances. For example, a latex containing 4% of any modifier listed may be heated for substantial times at temperatures at or near the boiling point of water without viscosity change so that heat which calls forth the dormant coagulation properties of some materials has no such effect on these. Moreover a very large amount of modifier will not cause thickening or coagulation. A 60% centrifuged latex containing 100 dry parts of di-(p.hydroxyphenyl)-1,1-cyclohexane showed no viscosity change after two months room storage temperature.

Since all of the modifiers listed are substantially water insoluble, I have found it convenient to ball mill them separately and to add the ball milled dispersion to latex. Thereafter, modification proceeds at a measurable rate depending upon the character and concentration of the modifying agent, the length of time ball milled, the temperature at which modification be carried out, and the previous history of the latex.

The longer the modifier has been ball milled the more rapid will be the rate at which it modifies or sensitizes the latex. The rate of modification is also increased by heating the latex compounded with the modifier.

The term "developer," as herein used, connotes both organic and inorganic compounds capable of acting on the sensitized latex so as to produce substantial thickening.

Developers for a modified latex need not be coagulants or thickeners for ordinary latex. I have found that the oxides of zinc, cadmium and copper, and the zinc, cadmium or copper salts of weak organic acids such as benzoic, tartaric or citric acid readily thicken the modified latex but have substantially no effect upon the regular unmodified product, e. g., normal and concentrated latex.

However, that developer which I have found of most use in the practice of my invention is the zinc-ammonia complex. It may be prepared by dissolving 25 parts of zinc chloride or zinc benzoate in 75 parts of 26° Baumé ammonium hydroxide solution.

In addition to its practical advantages, this material provides an excellent measure or yardstick of the chemical sensitivity of my new modified latex. For example, a latex which has been modified with about 4% on the dry rubber of any of the modifiers shown in Groups A or B and in which modification has been carried largely or wholly to completion is thickened by the addition of less than 1% of zinc-ammonia complex, based on the rubber, even in the cold. If a cold form, coated with a dried deposit of zinc-ammonia complex be dipped into a latex modified with any of Group A materials, the latex is so thickened around the form as to produce an apparently solid wet deposit thereon.

In preparing a modified latex in accordance with the present invention, the following precautions should be borne in mind:

A dilute latex may be modified, but dilution after modification destroys some or all of the sensitizing effect.

Some compounding ingredients must be used with care. Fixed alkalies such as sodium hydroxide or tri sodium phosphate inhibit modification. Zinc oxide may cause premature gelation or coagulation. For example, a 60% ammoniacal latex containing curing ingredients which include 1% of zinc oxide on the dry rubber as an activator will coagulate in a few hours after adding 0.4% of di-(p-hydroxyphenyl)-1,1-cyclohexane.

If the compounded latex be vulcanized, however, before attempted modification, the zinc oxide is rendered sufficiently inactive by side reactions, such as those with the accelerator used, as to allow the modifier to be added without danger of thickening.

The following examples are illustrative of what is now considered a satisfactory practice of the invention:

*Example 1.—Modification upon standing at room temperature*

To a 60% vulcanized latex (100 parts dry rubber) is added 4 dry parts of di-(p-hydroxyphenyl)-1,1-cyclohexane from a 40% ball milled dispersion. After standing overnight at room temperature, modification is substantially complete.

A cold form is then dipped into an aqueous developing solution containing about 25% of zinc-ammonia complex, dried and then dipped into the modified latex. In 10–60 seconds a layer of about 0.020" in thickness will have been formed. No deposit is produced upon a similar form dipped under the same conditions into unmodified latex.

*Example 2.—Modification upon heating*

A 60% centrifuged latex (100 parts dry rubber) is heated for ½ hour at 190° F. with 4 parts of di-(p-hydroxyphenyl-1,1-cyclohexane from a 40% ball milled dispersion. No viscosity change takes place.

The modified latex is then cooled to room temperature and developer equivalent to 0.1% zinc-ammonia complex on the dry rubber is added, whereupon rapid local thickening takes place.

*Example 3.—Dual modification*

A mixture of 4 parts of ball milled Lithol Red Toner (containing 30% solids) and 0.5 part of ball milled anti-oxidant (containing 40% solids) is first passed through a Premier Mill set at 0.002" and this mixture is then added to 100 parts of 50% vulcanized latex (Vultex). In case it is desired to remove any coarse particles of pigment, the material may be clarified by centrifuging, and after such clarification dual modification is effected by incorporating modifying agents consisting of a mixture of 0.25 part of 40% ball milled p.p'-dihydroxydiphenyl and 0.25 part of 40% ball milled di-(p-hydroxyphenyl)-1,1-cyclohexane. Within twenty-four hours the stock will be found to be modified so as to become thickened upon the addition of small amounts (0.1% to 1.0%) developer.

Methods of use

A modified latex, preferably vulcanized as in Examples 1 and 3, may be employed in the direct production of rubber articles by molding. Within the meaning of this specification a mold is any form, pervious or impervious, which gives the desired shape to a rubber article. For example, a mold may be a dipping form for external molding, an internal mold, a belt or a drum for rubber sheeting, an extrusion orifice or a grooved disk.

The mold is coated or impregnated with the developer. This may be done in any of the usual ways, as, for example, by applying a solution or dispersion of developer to the form and then effecting thickening on the form while it is still wet; or by the application of the developer to the form and drying before use.

The method of applying such modified latex to the coated mold varies with the type of mold. If a coated dipping form is used it is immersed in a bath of latex. If a coated extrusion orifice or die is used, the latex is forced therethrough; if a coated belt is used, the latex may be applied by dipping, flowing or spraying. If it is desired to build up a comparatively relatively thick article, I prefer to use a solution of zinc-ammonia complex as developer for the coating of the form; if a relatively thin one is desired, I prefer a coating of zinc oxide.

Such modified latex is particularly useful in securing a good rubber-to-metal contact, for example, rubber-coated tool handles, such as pliers and the like, rubber-covered kitchen or household utensils, bottle caps of the crown type, and rubber-protected metallic surfaces exposed to vapors corrosive of metal but non-corrosive of rubber, such as the vapors of fluorsilicic acid.

The part of the article to receive the rubber coating is first coated with chlorinated or depolymerized rubber as a primer. Before this primer is dry, the developer, preferably a solution of the zinc-ammonia complex, is applied to it in any well known way. Alternatively the primer may be mixed with developer before application. Then the article is dipped in a bath of modified latex long enough to build up on the article a covering of the desired thickness. As far as I am aware this process of securing a rubber-to-metal adhesion is new.

In the formation of articles such as thread by extrusion, I prefer to extrude the modified latex through the forming orifice into a solution of the zinc-ammonia complex, instead of forming it through a forming orifice or dies covered with the developer.

Fibrous material of all kinds may be impregnated or coated by means of my new modified latex. In coating, wadding, batting, felted, knitted or woven materials from any kind of fiber, vegetable, animal or mineral, may be treated with a solution or dispersion of developer which may then be dried or not before application of the modified latex. For impregnation I prefer to impregnate the material with modified latex by immersion to be followed by immersion in a bath of developer. For a superficial coating I prefer to apply a dispersion of zinc oxide as developer to be followed after drying by a spray application of the modified latex.

It is apparent that either the developer or the modified latex may be applied by immersion, flowing or spraying; that the developer may or may not be dried before use; and that the material after the application of the modified latex may or may not be heated.

I have described typical examples of manufacturing processes in which my new material is particularly useful, but such description is to be considered by way of illustration and not by way of limitation.

In the appended claims I use the word "latex" to include any natural or artificial dispersion of natural or artificial rubber, whether crude or vulcanized, concentrated or diluted, compounded or uncompounded. By "vulcanized latex" I mean a latex in which the rubber sulphur combination has proceeded at the least to that point in the rubber particles at which a coagulum formed from those particles will not form a smooth liquid solution in gasoline. Obviously the vulcanization can progress further than this, but at this point vulcanization may be said to begin.

I claim:

1. Latex substantially free of fixed alkali containing 0.1% to 10% of di-(p-hydroxyphenyl)-1,1-cyclohexane, said latex being thickened by the zinc-ammonia complex in an amount less than 1% on the rubber.

2. Latex substantially free of fixed alkali containing 0.1% to 10% of a mixture of p.p'-dihydroxydiphenyl and di-(p-hydroxyphenyl)-1,1-cyclohexane, said latex being thickened by the zinc-ammonia complex in an amount of less than 1% on the rubber.

3. Latex substantially free of fixed alkali containing 0.1% to 10% of a compound selected from a group consisting of p.p'-dihydroxydiphenyl, benzidene, p-hydroxydiphenyl, di-(p-hydroxyphenyl)-1,1-cyclohexane, p,p'-diaminodiphenylmethane, diphenylamine, p-diphenyl benzene, 2,4-diaminodiphenylamine, diphenyl oxide, diphenyl sulphoxide, diphenylene oxide, dibenzyl, p-hydroxyazobenzene, p-hydroxypropiophenone, diphenyl, p-cyclohexylphenol, diphenyl sulphide, said latex being thickened by the zinc-ammonia complex in an amount less than 1% on the rubber.

4. Latex substantially free of fixed alkali modified on heating with 0.1% to 10% of a compound selected from the group consisting of p.p'-dihydroxydiphenyl, benzidene, p-hydroxydiphenyl, di-(p-hydroxyphenyl)-1,1-cyclohexane, p,p'-diaminodiphenylmethane, diphenylamine, p-diphenyl benzene, 2,4-diaminodiphenylamine, diphenyl oxide, diphenyl sulphoxide, diphenylene oxide, dibenzyl, p-hydroxyazobenzene, p-hydroxypropiophenone, diphenyl, p-cyclohexylphenol, diphenyl sulphide, said modified latex being thickened by the zinc-ammonia complex in an amount less than 1% on the rubber.

DUNCAN W. MacLEOD.